(12) United States Patent
Hart

(10) Patent No.: US 9,347,530 B2
(45) Date of Patent: May 24, 2016

(54) MULTI-SPEED TRANSMISSION

(71) Applicant: GM Global Technology Operations LLC, Detroit, MI (US)

(72) Inventor: James M. Hart, Belleville, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 0 days.

(21) Appl. No.: 14/640,792

(22) Filed: Mar. 6, 2015

(65) Prior Publication Data

US 2015/0267783 A1    Sep. 24, 2015

Related U.S. Application Data

(60) Provisional application No. 61/968,939, filed on Mar. 21, 2014.

(51) Int. Cl.
*F16H 3/66* (2006.01)

(52) U.S. Cl.
CPC ............. *F16H 3/666* (2013.01); *F16H 3/663* (2013.01); *F16H 2200/0078* (2013.01); *F16H 2200/201* (2013.01); *F16H 2200/2012* (2013.01); *F16H 2200/2023* (2013.01); *F16H 2200/2046* (2013.01)

(58) Field of Classification Search
CPC ............. F16H 2200/2043; F16H 2001/289; F16H 2200/0078
USPC .................................................. 475/275
See application file for complete search history.

(56) References Cited

U.S. PATENT DOCUMENTS

| | | | |
|---|---|---|---|
| 8,197,375 B1 | 6/2012 | Hart | |
| 8,277,355 B2 | 10/2012 | Hart | |
| 8,343,007 B2 | 1/2013 | Hart | |
| 8,353,801 B2 | 1/2013 | Hart | |
| 8,523,729 B2 | 9/2013 | Hart | |
| 8,715,130 B2 | 5/2014 | Mellet | |
| 8,758,185 B2 | 6/2014 | Mellet | |
| 8,894,534 B2 | 11/2014 | Mellet | |
| 9,074,663 B2 | 7/2015 | Mellet | |
| 2011/0256977 A1* | 10/2011 | Hart | F16H 3/66 475/275 |
| 2012/0088625 A1* | 4/2012 | Phillips | F16H 3/663 475/275 |
| 2014/0357434 A1 | 12/2014 | Lundberg | |
| 2015/0267786 A1* | 9/2015 | Hart | F16H 3/666 475/275 |
| 2015/0267787 A1* | 9/2015 | Hart | F16H 3/666 475/275 |

* cited by examiner

*Primary Examiner* — Colby M Hansen
*Assistant Examiner* — Stacey Fluhart

(57) ABSTRACT

A transmission is provided having an input member, an output member, at least three planetary gear sets, a plurality of coupling members and a plurality of torque transmitting devices. The torque transmitting devices include clutches and brakes actuatable in combinations of three to establish a plurality of forward gear ratios and at least one reverse gear ratio.

44 Claims, 8 Drawing Sheets

| GEAR STATE | GEAR RATIO | RATIO STEP | TORQUE TRANSMITTING ELEMENTS | | | | | |
|---|---|---|---|---|---|---|---|---|
| | | | 122 | 124 | 126 | 128 | 130 | 132 |
| REV | -2.931 | | X | X | | | | X |
| N | | -0.61 | | | | | | |
| 1ST | 4.816 | | X | X | X | | | |
| 2ND | 3.561 | 1.35 | X | X | | X | | |
| 3RD | 2.550 | 1.40 | X | | X | X | | |
| 4TH | 1.972 | 1.29 | X | | | X | X | |
| 5TH | 1.890 | 1.04 | X | | | X | | X |
| 6TH | 1.654 | 1.14 | X | | | | X | X |
| 7TH | 1.429 | 1.16 | X | | X | | | X |
| 8TH | 1.255 | 1.14 | X | | X | | X | |
| 9TH | 1.000 | 1.26 | | | | X | X | X |
| 9TH | 1.000 | | | X | X | X | | |
| 9TH | 1.000 | | | X | X | | | X |
| 9TH | 1.000 | | | X | | | X | X |
| 10TH | 0.915 | 1.09 | | X | X | | X | |
| 11TH | 0.847 | 1.08 | | X | X | | | X |
| 12TH | 0.783 | 1.08 | | X | | | X | X |
| 13TH | 0.723 | 1.08 | | X | | X | | X |
| 14TH | 0.677 | 1.07 | | X | X | X | | |
| OVERALL RATIO | 7.12 | | | | | | | |

X = ON - ENGAGED CARRYING TORQUE

| GEAR STATE | GEAR RATIO | RATIO STEP | TORQUE TRANSMITTING ELEMENTS | | | | | |
|---|---|---|---|---|---|---|---|---|
| | | | 122 | 124 | 126 | 128 | 130 | 132 |
| REV | -2.701 | | X | X | | | | |
| N | | -0.59 | O | O | | | | |
| 1ST | 4.542 | | X | X | X | | | |
| 2ND | 3.341 | 1.36 | X | X | | X | | |
| 3RD | 2.459 | 1.36 | X | | X | X | | |
| 4TH | 1.926 | 1.28 | X | | | X | X | |
| 5TH | 1.863 | 1.03 | X | | | X | | X |
| 6TH | 1.669 | 1.12 | X | | | | X | X |
| 7TH | 1.404 | 1.19 | X | X | | | | X |
| 8TH | 1.201 | 1.17 | X | | X | | X | |
| 9TH | 1.000 | 1.20 | | | X | X | X | |
| 10TH | 0.932 | 1.07 | | X | X | | X | |
| 11TH | 0.851 | 1.10 | | X | X | | | X |
| 12TH | 0.773 | 1.10 | | X | | | X | X |
| 13TH | 0.723 | 1.07 | | X | | X | | X |
| 14TH | 0.686 | 1.06 | | X | | X | X | |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS ||||||
|---|---|---|---|---|---|---|---|---|
| | | | 222 | 224 | 226 | 228 | 230 | 232 |
| REV | -1.911 | | X | X | | | | X |
| N | | -0.44 | O | O | | | | |
| 1ST | 4.302 | | X | X | X | | | |
| 2ND | 3.127 | 1.38 | X | X | | X | | |
| 3RD | 2.225 | 1.41 | X | | X | X | | |
| 4TH | 1.770 | 1.26 | X | | | X | X | |
| 5TH | 1.698 | 1.04 | X | | | X | | X |
| 6TH | 1.517 | 1.12 | X | | | | X | X |
| 7TH | 1.339 | 1.13 | X | | X | | | X |
| 8TH | 1.176 | 1.14 | X | | X | | X | |
| 9TH | 1.000 | 1.18 | | | X | X | X | |
| 10TH | 0.925 | 1.08 | | X | X | | X | |
| 11TH | 0.844 | 1.10 | | X | X | | | X |
| 12TH | 0.780 | 1.08 | | X | | | X | X |
| 13TH | 0.724 | 1.08 | | X | | X | | X |
| 14TH | 0.672 | 1.08 | | X | | X | X | |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | | | |
|---|---|---|---|---|---|---|---|---|
| | | | 322 / 422 / 522 | 324 / 424 / 524 | 326 / 426 / 526 | 328 / 428 / 528 | 330 / 430 / 530 | 332 / 432 / 532 |
| REV | -3.353 | | X | X | | | | X |
| N | | -0.73 | O | O | | | | |
| 1ST | 4.610 | | X | X | X | | | |
| 2ND | 3.375 | 1.37 | X | X | | X | | |
| 3RD | 2.602 | 1.30 | X | | X | X | | |
| 4TH | 2.076 | 1.25 | X | | | X | X | |
| 5TH | 2.021 | 1.03 | X | | | X | | X |
| 6TH | 1.803 | 1.12 | X | | | | X | X |
| 7TH | 1.460 | 1.23 | X | | X | | | X |
| 8TH | 1.235 | 1.18 | X | | X | | X | |
| 9TH | 1.000 | 1.24 | | | X | X | X | |
| 10TH | 0.930 | 1.07 | | X | X | X | | |
| 11TH | 0.851 | 1.09 | | X | X | | | X |
| 12TH | 0.762 | 1.12 | | X | | | X | X |
| 13TH | 0.713 | 1.07 | | X | | X | | X |
| 14TH | 0.681 | 1.05 | | X | | X | X | |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | | | |
|---|---|---|---|---|---|---|---|---|
| | | | 622 / 722 / 822 | 624 / 724 / 824 | 626 / 726 / 826 | 628 / 728 / 828 | 630 / 730 / 830 | 632 / 732 / 832 |
| REV | -2.809 | | X | X | | | | X |
| N | | -0.62 | O | O | | | | |
| 1ST | 4.517 | | X | X | X | | | |
| 2ND | 3.314 | 1.36 | X | X | | X | | |
| 3RD | 2.432 | 1.36 | X | | X | X | | |
| 4TH | 1.912 | 1.27 | X | | | X | X | |
| 5TH | 1.858 | 1.03 | X | | | X | | X |
| 6TH | 1.685 | 1.10 | X | | | | X | X |
| 7TH | 1.408 | 1.20 | X | | X | | | X |
| 8TH | 1.203 | 1.17 | X | | X | | X | |
| 9TH | 1.000 | 1.20 | | | X | X | X | |
| 10TH | 0.929 | 1.08 | | X | X | | X | |
| 11TH | 0.845 | 1.10 | | X | X | | | X |
| 12TH | 0.761 | 1.11 | | X | | | X | X |
| 13TH | 0.715 | 1.06 | | X | | X | | X |
| 14TH | 0.682 | 1.05 | | X | | X | X | |

X = ON - ENGAGED CARRYING TORQUE
O = ON - ENGAGED NOT CARRYING TORQUE

FIG. 14

MULTI-SPEED TRANSMISSION

CROSS-REFERENCE TO RELATED APPLICATIONS

This application claims priority to U.S. Provisional Application No. 61/968,939, filed on Mar. 21, 2014, which is hereby incorporated in its entirety herein by reference.

FIELD

The invention relates generally to a multiple speed transmission, and more particularly, to a transmission having a plurality speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant. Accordingly, there is a need for an improved, cost-effective, compact multiple speed transmission.

SUMMARY

A transmission is provided having an input member, an output member, a first, second, and third planetary gear sets, two interconnecting members, and six torque transmitting mechanisms. The planetary gear sets each have at least a first, second, and third members. The first planetary gear set further includes a fourth member. The two interconnecting members continuously interconnect a member of the first, second, and third planetary gear sets with another member of the first, second, and third planetary gear sets. The six torque transmitting mechanisms each selectively engageable to interconnect a member of the first, second, and third planetary gear sets with another member of the first, second, and third planetary gear sets or a stationary member. The six torque transmitting mechanisms are selectively engageable in combinations of at least three to establish a plurality of forward speed ratios and at least one reverse speed ratio between the input member and the output member.

In one example of the present invention, a first of the two interconnecting members continuously interconnects the fourth member of the first planetary gear set with the third member of the second planetary gear set.

In another example of the present invention, a second of the two interconnecting members continuously interconnects the second member of the second planetary gear set with the first member of the third planetary gear set.

In yet another example of the present invention, a first of the six torque transmitting mechanisms is selectively engageable to interconnect the first member of the first planetary gear set with the first member of the second planetary gear set.

In yet another example of the present invention, a second of the six torque transmitting mechanisms is selectively engageable to interconnect the first member of the first planetary gear set with the second member of the second planetary gear set.

In yet another example of the present invention, a third of the six torque transmitting mechanisms is selectively engageable to interconnect the third member of the first planetary gear set with the second member of the third planetary gear set.

In yet another example of the present invention, a fourth of the six torque transmitting mechanisms is selectively engageable to interconnect the third member of the second planetary gear set with the third member of the third planetary gear set.

In yet another example of the present invention, a fifth of the six torque transmitting mechanisms is selectively engageable to interconnect the first member of the second planetary gear set with the stationary member.

In yet another example of the present invention, a sixth of the six torque transmitting mechanisms is selectively engageable to interconnect the third member of the third planetary gear set with the stationary member.

In yet another example of the present invention, the input member is continuously connected for common rotation with the second member of the first planetary gear set.

In yet another example of the present invention, the output member is continuously connected for common rotation with the second member of the third planetary gear set.

In yet another example of the present invention, the first member of the first planetary gear set, the first member of the second planetary gear set, and the third member of the third planetary gear set are first sun gears, the first member of the second planetary gear set and the second member of the third planetary gear set are ring gears, and the second member of the second planetary gear set and the third member of the third planetary gear set are planet carriers.

In yet another example of the present invention, the second member of the first planetary gear set is a ring gear, the third member of the first planetary gear set is a planet carrier, and the fourth member of the first planetary gear set is a combined sun/ring gear.

In yet another example of the present invention, the second and third members of the first planetary gear set include a ring gear combined with a planet carrier and the fourth member of the first planetary gear set is a sun gear.

In yet another example of the present invention, the second member of the first planetary gear set is a planet carrier, the third member of the first planetary gear set is a ring gear, the fourth member of the first planetary gear set is a second sun gear, and the first planetary gear set includes a first and a second set of pinions rotatably supported by the planet carrier, the first set of pinions are long pinions and mesh with the first sun gear, the ring gear, and the second set of pinions, and the second set of pinions are short pinions and mesh with the first set of pinions and the second sun gear.

In yet another example of the present invention, the second member of the first planetary gear set is a planet carrier, the third member of the first planetary gear set is a ring gear, the fourth member of the first planetary gear set is a second sun gear, and the first planetary gear set includes a first and a second set of pinions rotatably supported by the planet carrier, the first set of pinions are short pinions and mesh with the first sun gear, the ring gear, and the second set of pinions, and the second set of pinions are long pinions and mesh with the first set of pinions and the second sun gear.

In yet another example of the present invention, the second member of the first planetary gear set is a planet carrier, the third member of the first planetary gear set is a ring gear, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion mesh with the first sun gear, the small diameter portion mesh with the ring gear and the second set of pinions, and the second set of pinions are short pinions and mesh with the small diameter portion of the first set of pinions and the second sun gear.

In yet another example of the present invention, the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions, the first set of pinions mesh with the first sun gear and the second set of pinions, the second set of pinions are long pinions and mesh with the ring gear and the second sun gear.

In yet another example of the present invention, the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion mesh with the second sun gear and the ring gear, the small diameter portion mesh with the second set of pinions, and the second set of pinions are short pinions and mesh with the small diameter portion of the first set of pinions and the first sun gear.

In yet another example of the present invention, the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are long pinions meshing with the first sun gear and the second set of pinions, and the second set of pinions are short pinions and mesh with the first set of pinions, the ring gear, and the second sun gear.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 14 is a truth table presenting an example of a state of engagement of various torque transmitting elements to produce multiple forward and at least one reverse speed or gear ratios of the transmissions illustrated in FIGS. 1 and 11-13.

DETAILED DESCRIPTION

The following description is merely exemplary in nature and is not intended to limit the present disclosure, application, or uses.

Figure 1:
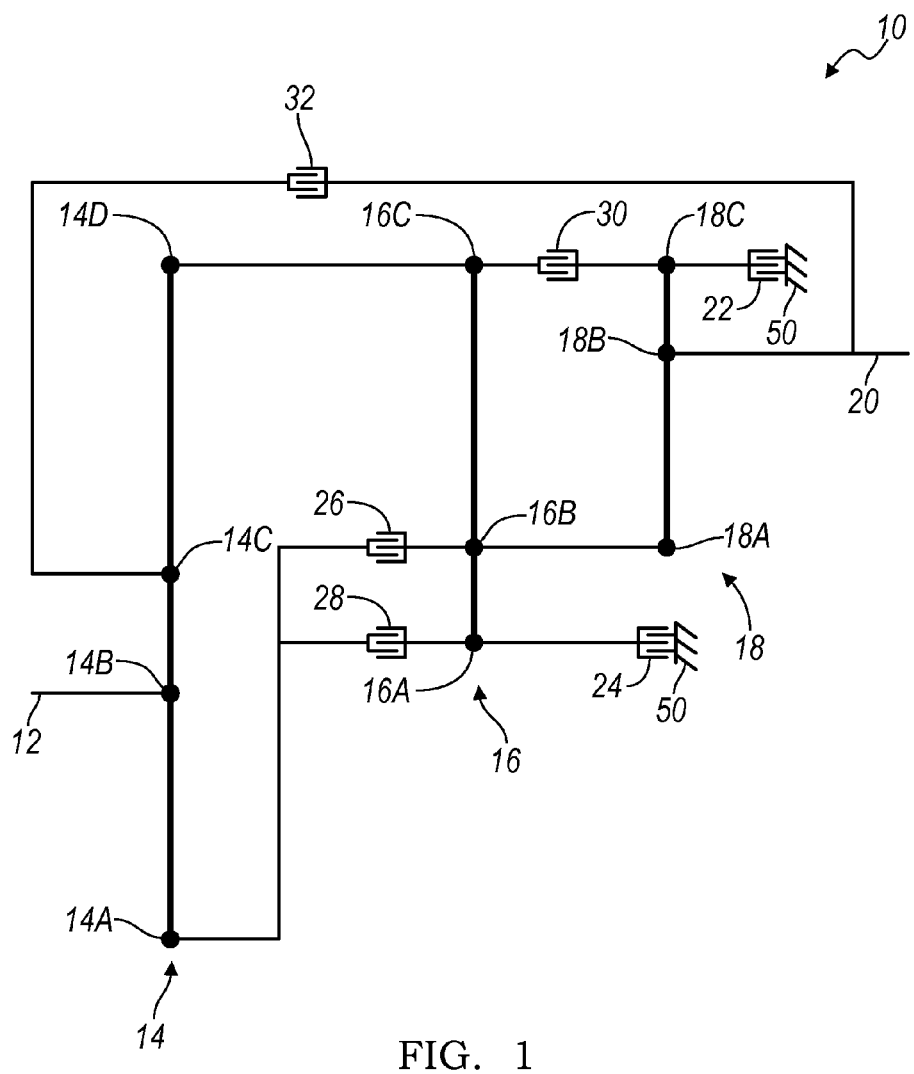
FIG. 1 is a lever diagram of an embodiment of a transmission according to the principles of present invention.

Referring now to FIG. 1, an embodiment of a multi-speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. Alternatively, a lever represents a planetary gear set assembly wherein a node represents one of four things: one of the three basic mechanical components of the planetary gear set, a coupling of one of the three basic mechanical components of a first planetary gear set and one of the three basic mechanical components of a second planetary gear set, one of the four basic mechanical components of a stacked planetary gear set, or one of the four basic mechanical components of a Ravineaux gear set. Therefore, a single lever of this type contains four nodes. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, and a third planetary gear set 18, and an output shaft or member 20. In the lever diagram of FIG. 1, the first planetary gear set 14 has four nodes: a first node 14A, a second node 14B, a third node 14C, and a fourth node 14D. The second planetary gear set 16 has three nodes: a first node 16A, a second node 16B and a third node 16C. The third planetary gear set 18 has three nodes: a first node 18A, a second node 18B and a third node 18C. The input member 12 is continuously coupled to the second node 14B of the first planetary gear set 14. The output member 20 is continuously coupled to the second node 18B of the third planetary gear set 18.

The fourth node 14D of the first planetary gear set 14 is coupled to the third node 16C of the second planetary gear set 16. The second node 16B of the second planetary gear set 16 is coupled the first node 18A of the third planetary gear set 18.

A first clutch 22 selectively connects the third node 18C of the third planetary gear set 18 with a stationary member 50. A second clutch 24 selectively connects the first node 16A of the second planetary gear set 16 with the stationary member 50. A third clutch 26 selectively connects the first node 14A of the first planetary gear set 14 with the second node 16B of the second planetary gear set 16. A fourth clutch 28 selectively connects the first node 14A of the first planetary gear set 14 with the first node 16A of the second planetary gear set 16. A fifth clutch 30 selectively connects the fourth node 14D of the first planetary gear set 14 and the third node 16C of the second planetary gear set 16 with the third node 18C of the third planetary gear set 18. A sixth clutch 32 selectively connects the third node 14C of the first planetary gear set 14 with the output shaft or member 20.

Figures 2, 3:
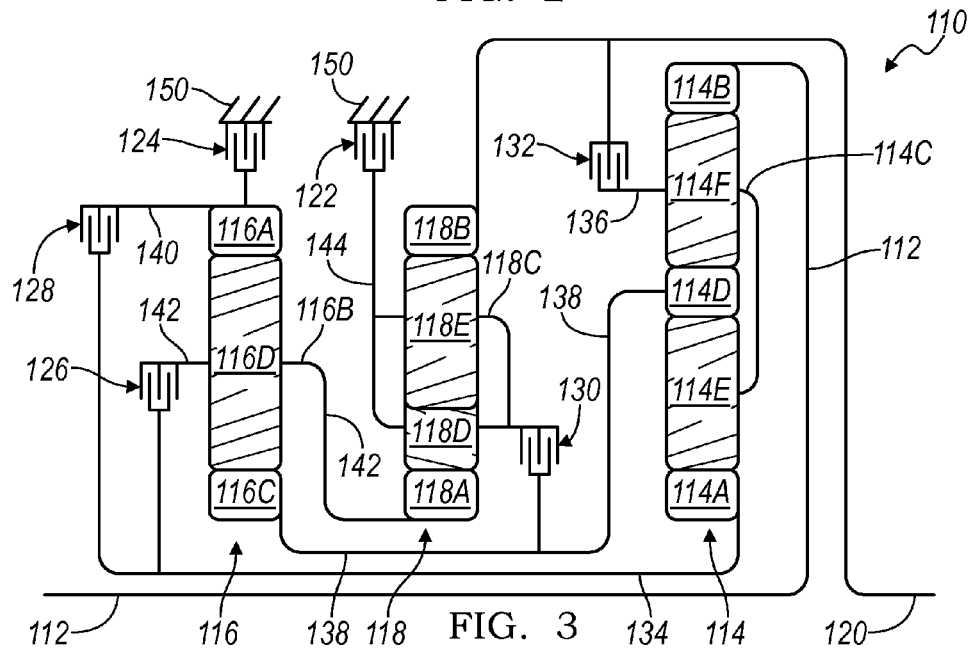
FIG. 2 is a truth table presenting an example of a state of engagement of various torque transmitting elements to produce multiple forward and at least one reverse speed or gear ratios of the transmissions illustrated in FIG. 1.
FIG. 3 is a diagrammatic illustration of a variation of the transmission of FIG. 1 according to the principles of the present invention.

Referring now to FIGS. 1 and 2, the operation of the multi-speed transmission 10 will be described. It will be appreciated that transmission 10 is capable of transmitting torque from the input shaft or member 12 to the output shaft or member 20 in multiple forward speed torque ratios and at least one reverse speed or torque ratio. Each forward and reverse speed or torque ratio is attained by engagement of one or more of the torque-transmitting mechanisms (i.e. first brake 22, second brake 24, first clutch 26, second clutch 28, third clutch 30, and fourth clutch 32), as will be explained below.

FIG. 2 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example, a reverse gear is established by engaging or activating the first brake 22, second brake 24, and the fourth clutch 32. The first brake 22 connects the third node 18C of the third planetary gear set 18 to the transmission housing 50 in order to restrict the third node 18C of the third planetary gear set 18 from rotating relative to the transmission housing 50. The second brake 24 connects first node 16A of the second planetary gear set 16 to the transmission housing 50 in order to restrict the first node 16A of the second planetary gear set 16 from rotating relative to the transmission housing 50. The fourth clutch 32 connects the third node 14C of the first planetary gear set 14 with output shaft or member 20. Likewise, the fourteen forward ratios are achieved through different combinations of clutch and brake engagement, as shown in FIG. 3, by way of example. Moreover, FIG. 2 shows four different clutch and brake engagement combinations contemplated by the present invention for achieving a ninth gear.

Referring now to FIG. 3, a stick diagram presents a schematic layout of another embodiment of the multi-speed transmission 110 according to one form of the present invention. The clutches and couplings are correspondingly presented whereas the nodes of the planetary gear sets of FIG. 1 now appear as components of planetary gear sets or planetary gear set assemblies such as sun gears, ring gears, planet gears, combination or common gears, and planet gear carriers.

For example, a first planetary gear set assembly 114 is a stacked planetary gear set 114 that includes a sun gear member 114A, a planet gear carrier 114C, a sun/ring common gear member 114D, and a ring gear member 114B. The planet gear carrier 114C rotatably supports a first and a second set of pinion gears 114E, 114F (only one of each set is shown). The sun/ring common gear member 114D is an annular shaped gear having a plurality of gear teeth on both the inner periphery and the outer periphery of the gear. The sun gear member 114A is connected for common rotation with a first shaft or interconnecting member 134. The planet gear carrier 114C is connected for common rotation with a second shaft or interconnecting member 136. The sun/ring common gear member 114D is connected for common rotation with a third shaft or interconnecting member 138. The ring gear member 114B is connected for common rotation with the input shaft or member 112. The set of planet gears 114E are each configured to intermesh with both the sun gear member 114A and the sun/ring common gear member 114D. The set of planet gears 114F are each configured to intermesh with both the sun/ring common gear member 114D and the ring gear member 114B.

A second planetary gear set assembly 116 is a first planetary gear set 116 having a sun gear member 116C, a ring gear member 116A, and a planet gear carrier member 116B that rotatably supports a set of planetary gears 116D (only one of each is shown). The sun gear member 116C is connected for common rotation with the third shaft or interconnecting member 138. The ring gear member 116A is connected for common rotation with a fourth shaft or interconnecting member 140. The planet carrier member 116B is connected for common rotation with a fifth shaft or interconnecting member 142. The planet gears 116D are each configured to intermesh with both the sun gear member 116C and the ring gear member 116A.

A third planetary gear set assembly 118 is a second planetary gear set 118 having a sun gear member 118A, a ring gear member 118B, and a planet gear carrier member 118C that rotatably supports a first set of planet gears 118D (only one of which is shown) and a second set of planet gears 118E (only one of which is shown). The sun gear member 118A is connected for common rotation with the fifth shaft or interconnecting member 142. The ring gear member 118B is connected for common rotation with the output shaft or member 120. The planet carrier member 118C is connected for common rotation with a sixth shaft or interconnecting member 144. The planet gears 118D are each configured to intermesh with both the sun gear member 118A and the second set of planet gears 118E. The planet gears 118E are each configured to intermesh with both the ring gear member 118B and the first set of planet gears 118D.

The input shaft or member 112 is continuously connected to an input source, such as an engine (not shown) or a turbine of a torque converter (not shown). The output shaft or member 120 is continuously connected with another output such as the final drive unit or transfer case (not shown).

The torque-transmitting mechanisms, including a first and second brakes 122, 124 and a first, second, third, and fourth clutches 126, 128, 130, 132 allow for selective interconnection of the shafts or interconnecting members 134, 136, 138, 140, 142, 144 to other shafts or interconnecting members 134, 136, 138, 140, 142, 144, the members of the planetary gear sets 114, 116, 118, or the stationary member or transmission housing 150.

For example, the first brake 122 is selectively engageable to connect the sixth shaft or interconnecting member 144 to the transmission housing 150 in order to restrict the planet gear carrier 118C from rotating relative to the transmission housing 150. The second brake 124 is selectively engageable to connect the fourth shaft or interconnecting member 140 to the transmission housing 150 in order to restrict the ring gear member 116A from rotating relative to the transmission housing 150. The first clutch 126 is selectively engageable to connect the first shaft or interconnecting member 134 with the fifth shaft or interconnecting member 142. The second clutch 128 is selectively engageable to connect the first shaft or interconnecting member 134 with the fourth shaft or interconnecting member 140. The third clutch 130 is selectively engageable to connect the third shaft or interconnecting member 138 with the sixth shaft or interconnecting member 144. The fourth clutch 132 is selectively engageable to connect the second shaft or interconnecting member 136 with the output shaft or member 120. In turn, the components of the planetary gear sets connected to each of the connecting members are also connected or restricted accordingly.

Figures 4, 5:
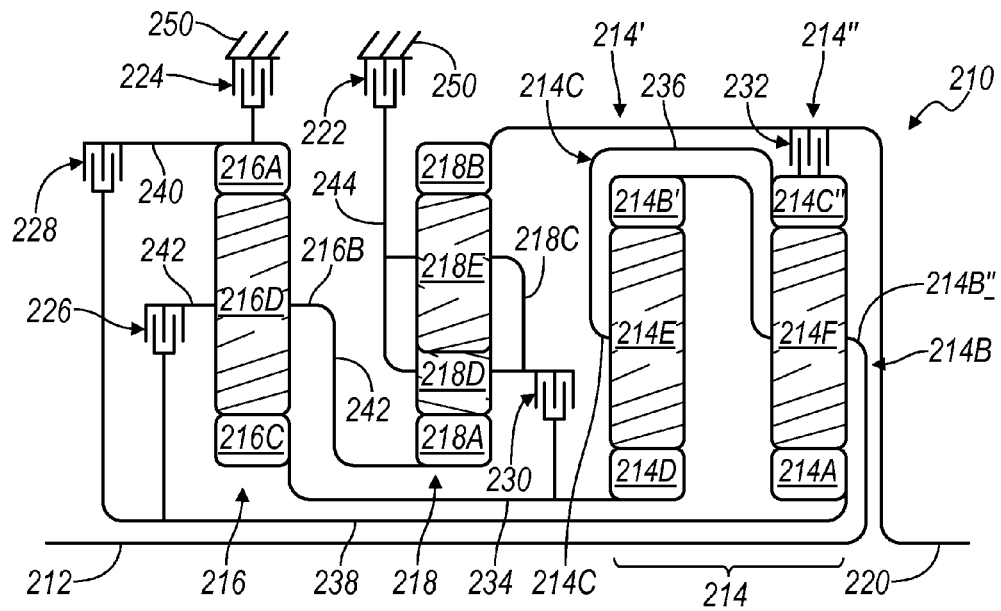
FIG. 4 is a truth table presenting an example of a state of engagement of various torque transmitting elements to produce multiple forward and at least one reverse speed or gear ratios of the transmissions illustrated in FIGS. 1 and 3.
FIG. 5 is a diagrammatic illustration of a variation of the transmission of FIG. 1 according to the principles of the present invention.

Referring now to FIGS. 1, 3, and 4, the operation of the multi-speed transmission 110 will be described. It will be appreciated that transmission 110 is capable of transmitting torque from the input shaft or member 112 to the output shaft or member 120 in multiple forward speed torque ratios and at least one reverse speed or torque ratio. Each forward and reverse speed or torque ratio is attained by engagement of one or more of the torque-transmitting mechanisms (i.e. first brake 122, second brake 124, first clutch 126, second clutch 128, third clutch 130, and fourth clutch 132), as will be explained below.

FIG. 4 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 110. Of course, other gear ratios are achievable depending on the gear diameter, gear teeth count and gear configuration selected.

For example, a reverse gear is established by engaging or activating the first brake 122, second brake 124, and the fourth clutch 132. The first brake 122 connects the sixth shaft or interconnecting member 144, and therefore the planet gear carrier 118C of the second planetary gear set 118, to the transmission housing 150 in order to restrict planet gear carrier 118C of the second planetary gear set 118 from rotating relative to the transmission housing 150. The second brake 124 connects the fourth shaft or interconnecting member 140, and therefore the ring gear 116A of the first planetary gear set 116, to the transmission housing in order to restrict the ring gear 116A of the first planetary gear set 116 from rotating relative to the transmission housing 150. The fourth clutch 132 connects the second shaft or interconnecting member 136, and therefore the planet gear carrier 114C of the stacked planetary gear set 114 with output shaft or member 120. Likewise, the fourteen forward ratios are achieved through different combinations of clutch and brake engagement, as shown in FIG. 4, by way of example.

Referring now to FIG. 5, a stick diagram presents a schematic layout of another embodiment of the multi-speed transmission 210 according to one form of the present invention. The clutches and couplings are correspondingly presented whereas the nodes of the planetary gear sets of FIG. 1 now appear as components of planetary gear sets such as sun gears, ring gears, planet gears and planet gear carriers.

For example, a first planetary gear set assembly 214 includes first planetary gear set 214' and a second planetary gear set 214". The first planetary gear set 214' includes a sun gear member 214D, a planet gear carrier 214C', and a ring gear member 214B'. The planet gear carrier 214C' rotatably supports a set of pinion gears 214E (only one of which is shown). The sun gear member 214D is connected for common rotation with a first shaft or interconnecting member 234. The planet gear carrier 214C' is connected for common rotation with a second shaft or interconnecting member 236. The ring gear member 214B' is connected for common rotation with the input shaft or member 212. The set of planet gears 214E are each configured to intermesh with both the sun gear member 214D and the ring gear member 214B'.

The second planetary gear set 214" includes a sun gear member 214A, a planet gear carrier 214B", and a ring gear member 214C". The planet gear carrier 214B" rotatably supports a set of pinion gears 214F (only one of which is shown). The sun gear member 214A is connected for common rotation with a third shaft or interconnecting member 238. The planet gear carrier 214B" is connected for common rotation with the input shaft or member 212 and thus combines with the ring gear member 214B' of the first planetary gear set 214' to form a first common rotating member 214B of the first planetary gear set assembly 214. The ring gear member 214C" is connected for common rotation with the second shaft or interconnecting member 236 and thus combines with the planet gear carrier 214C' of the first planetary gear set 214' to form a second common rotating member 214C of the first planetary gear set assembly 214. The set of planet gears 214F are each configured to intermesh with both the sun gear member 214A and the ring gear member 214C".

A second planetary gear set assembly 216 includes a third planetary gear set 216 having a sun gear member 216C, a ring gear member 216A and a planet gear carrier member 216B that rotatably supports a set of planetary gears 216D (only one of each is shown). The sun gear member 216C is connected for common rotation with the first shaft or interconnecting member 234. The ring gear member 216A is connected for common rotation with a fourth shaft or interconnecting member 240. The planet carrier member 216B is connected for common rotation with a fifth shaft or interconnecting member 242. The planet gears 216D are each configured to intermesh with both the sun gear member 216C and the ring gear member 216A.

A third planetary gear set assembly 218 includes a fourth planetary gear set 218 having a sun gear member 218A, a ring gear member 218B and a planet gear carrier member 218C that rotatably supports a first set of planet gears 218D (only one of which is shown) and a second set of planet gears 218E (only one of which is shown). The sun gear member 218A is connected for common rotation with the fifth shaft or interconnecting member 242. The ring gear member 218B is connected for common rotation with the output shaft or member 220. The planet carrier member 218C is connected for common rotation with a sixth shaft or interconnecting member 244. The planet gears 218D are each configured to intermesh with both the sun gear member 218A and the second set of planet gears 218E. The planet gears 218E are each configured to intermesh with both the ring gear member 218B and the first set of planet gears 218D.

The input shaft or member 212 is continuously connected to an input source, such as an engine (not shown) or a turbine of a torque converter (not shown). The output shaft or member 220 is continuously connected with another output such as the final drive unit or transfer case (not shown).

The torque-transmitting mechanisms, including a first and second brakes 222, 224 and a first, second, third, and fourth clutches 226, 228, 230, 232 allow for selective interconnection of the shafts or interconnecting members 234, 236, 238, 240, 242, 244 to other shafts or interconnecting members 234, 236, 238, 240, 242, 244 the members of the planetary gear sets 214, 216, 218, or the stationary member or transmission housing 250.

For example, the first brake 222 is selectively engageable to connect the sixth shaft or interconnecting member 244 to the transmission housing 250 in order to restrict the planet gear carrier 218C from rotating relative to the transmission housing 250. The second brake 224 is selectively engageable to connect the fourth shaft or interconnecting member 240 to the transmission housing 250 in order to restrict the ring gear member 216A from rotating relative to the transmission housing 250. The first clutch 226 is selectively engageable to connect the third shaft or interconnecting member 238 with the fifth shaft or interconnecting member 242. The second clutch 228 is selectively engageable to connect the third shaft or interconnecting member 238 with the fourth shaft or interconnecting member 240. The third clutch 230 is selectively engageable to connect the first shaft or interconnecting member 234 with the sixth shaft or interconnecting member 244. The fourth clutch 232 is selectively engageable to connect the second shaft or interconnecting member 236 with the output shaft or member 220. In turn, the components of the planetary gear sets connected to each of the connecting members are also connected or restricted accordingly.

Figures 6, 7:
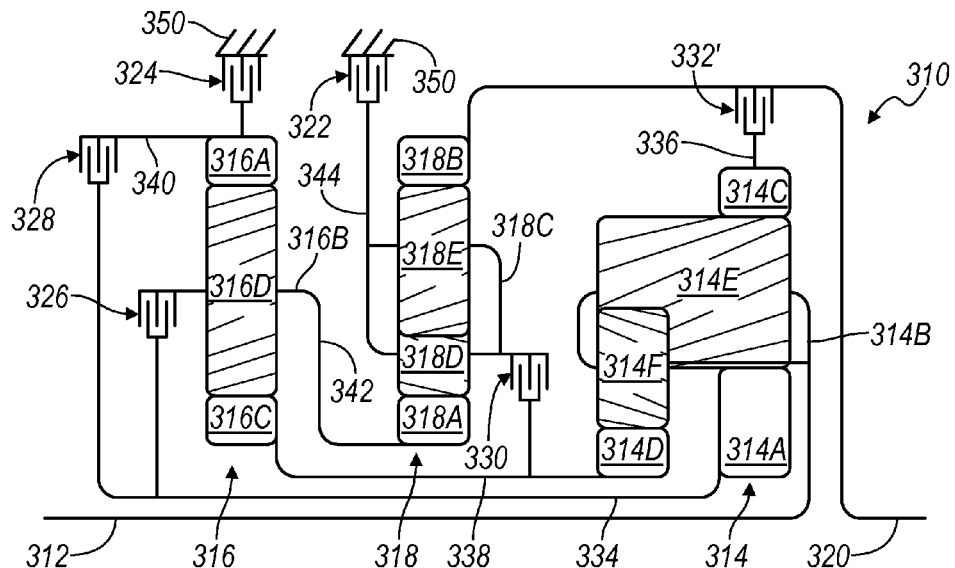
FIG. 6 is a truth table presenting an example of a state of engagement of various torque transmitting elements to produce multiple forward and at least one reverse speed or gear ratios of the transmissions illustrated in FIGS. 1 and 5.
FIG. 7 is a diagrammatic illustration of a variation of the transmission of FIG. 1 according to the principles of the present invention.

Referring now to FIGS. 1, 5, and 6, the operation of the multi-speed transmission 210 will be described. It will be appreciated that transmission 210 is capable of transmitting torque from the input shaft or member 212 to the output shaft or member 220 in multiple forward speed torque ratios and at least one reverse speed or torque ratio. Each forward and reverse speed or torque ratio is attained by engagement of one or more of the torque-transmitting mechanisms (i.e. first brake 222, second brake 224, first clutch 226, second clutch 228, third clutch 230, and fourth clutch 232), as will be explained below.

FIG. 6 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 210. Of course, other gear ratios are achievable depending on the gear diameter, gear teeth count and gear configuration selected.

For example, a reverse gear is established by engaging or activating the first brake 222, second brake 224, and the fourth clutch 232. The first brake 222 connects the sixth shaft or interconnecting member 244, and therefore the planet gear carrier 218C of the third planetary gear set assembly 218, to the transmission housing 250 in order to restrict planet gear carrier 218C of the third planetary gear set assembly 218 from rotating relative to the transmission housing 250. The second brake 224 connects the fourth shaft or interconnecting member 240, and therefore the ring gear 216A of the second planetary gear set assembly 216, to the transmission housing in order to restrict the ring gear 216A of the second planetary gear set 216 from rotating relative to the transmission housing 250. The fourth clutch 232 connects the second shaft or interconnecting member 236, and therefore the second common rotating member 214C of the first planetary gear set assembly 214 with output shaft or member 220. Likewise, the fourteen forward ratios are achieved through different combinations of clutch and brake engagement, as shown in FIG. 6, by way of example Referring now to FIG. 7, a stick diagram presents a schematic layout of another embodiment of the multi-speed transmission 310 according to one form of the present invention. The clutches and couplings are correspondingly presented whereas the nodes of the planetary gear sets of FIG. 1 now appear as components of planetary gear sets or planetary gear set assemblies such as sun gears, ring gears, planet gears, combination or common gears, and planet gear carriers.

For example, a first planetary gear set assembly 314 is a Ravigneaux gear set 314 that has a first sun gear member 314A, a ring gear member 314C, a second sun gear member 314D, and a planet gear carrier 314B. The planet gear carrier 314B rotatably supports a first and a second set of pinion gears 314E, 314F (only one of each set is shown). The sun gear member 314A is connected for common rotation with a first shaft or interconnecting member 334. The ring gear member 314C is connected for common rotation with a second shaft or interconnecting member 336. The second sun gear member 314D is connected for common rotation with a third shaft or interconnecting member 338. The planet gear carrier 314B is connected for common rotation with the input shaft or member 312. The first set of pinion gears 314E is a set of long pinions that are each configured to intermesh with the first sun gear member 314A, the ring gear member 314C, and the second set of pinion gears 314F. The second set of pinion gears 314F is a set of short pinion gears that are each configured to intermesh with both the second sun gear member 314D and the first set of pinion gears 314E.

A second planetary gear set assembly 316 includes a first planetary gear set 316 having a sun gear member 316C, a ring gear member 316A, and a planet gear carrier member 316B that rotatably supports a set of planetary gears 316D (only one of each is shown). The sun gear member 316C is connected for common rotation with the third shaft or interconnecting member 338. The ring gear member 316A is connected for common rotation with a fourth shaft or interconnecting member 340. The planet carrier member 316B is connected for common rotation with a fifth shaft or interconnecting member 342. The planet gears 316D are each configured to intermesh with both the sun gear member 316C and the ring gear member 316A.

A third planetary gear set assembly 318 includes a second planetary gear set 318 having a sun gear member 318A, a ring gear member 318B, and a planet gear carrier member 318C that rotatably supports a first set of planet gears 318D (only one of which is shown) and a second set of planet gears 318E (only one of which is shown). The sun gear member 318A is connected for common rotation with the fifth shaft or interconnecting member 342. The ring gear member 318B is connected for common rotation with the output shaft or member 320. The planet carrier member 318C is connected for common rotation with a sixth shaft or interconnecting member 344. The planet gears 318D are each configured to intermesh with both the sun gear member 318A and the second set of planet gears 318E. The planet gears 318E are each configured to intermesh with both the ring gear member 318B and the first set of planet gears 318D.

The input shaft or member 312 is continuously connected to an input source, such as an engine (not shown) or a turbine of a torque converter (not shown). The output shaft or member 320 is continuously connected with another output such as the final drive unit or transfer case (not shown).

The torque-transmitting mechanisms, including a first and second brakes 322, 324 and a first, second, third, and fourth clutches 326, 328, 330, 332 allow for selective interconnection of the shafts or interconnecting members 334, 336, 338, 340, 342, 344 to other shafts or interconnecting members 334, 336, 338, 340, 342, 344, the members of the planetary gear sets 314, 316, 318, or the stationary member or transmission housing 350.

For example, the first brake 322 is selectively engageable to connect the sixth shaft or interconnecting member 344 to the transmission housing 350 in order to restrict the planet gear carrier 318C from rotating relative to the transmission housing 350. The second brake 324 is selectively engageable to connect the fourth shaft or interconnecting member 340 to the transmission housing 350 in order to restrict the ring gear member 316A from rotating relative to the transmission housing 350. The first clutch 326 is selectively engageable to connect the first shaft or interconnecting member 334 with the fifth shaft or interconnecting member 342. The second clutch 328 is selectively engageable to connect the first shaft or interconnecting member 334 with the fourth shaft or interconnecting member 340. The third clutch 330 is selectively engageable to connect the third shaft or interconnecting member 338 with the sixth shaft or interconnecting member 344. The fourth clutch 332 is selectively engageable to connect the second shaft or interconnecting member 336 with the output shaft or member 320. In turn, the components of the planetary gear sets connected to each of the connecting members are also connected or restricted accordingly.

Figure 8:
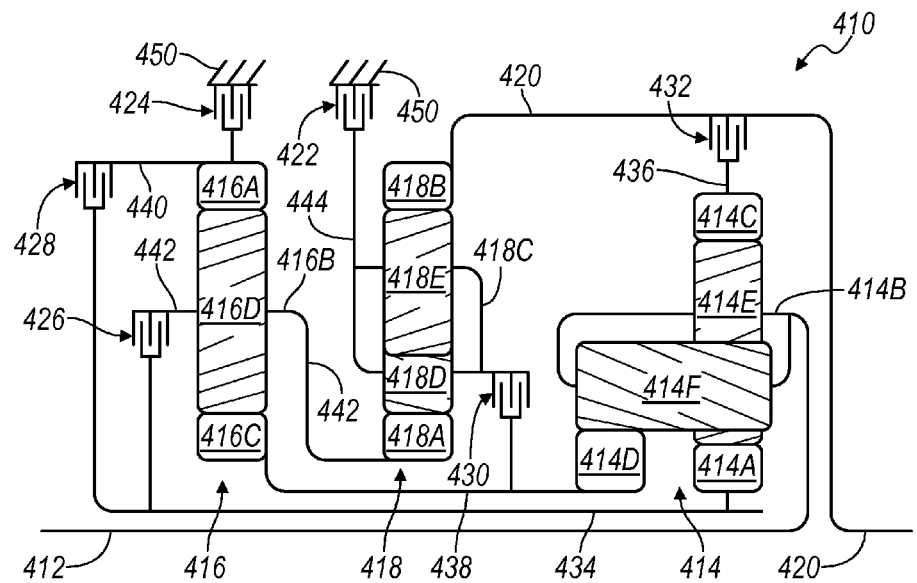
FIG. 8 is a diagrammatic illustration of a variation of the transmission of FIG. 1 according to the principles of the present invention.

Referring now to FIG. 8, a stick diagram presents a schematic layout of another embodiment of the multi-speed transmission 410 according to one form of the present invention. The clutches and couplings are correspondingly presented whereas the nodes of the planetary gear sets of FIG. 1 now appear as components of planetary gear sets or planetary gear set assemblies such as sun gears, ring gears, planet gears, combination or common gears, and planet gear carriers.

For example, a first planetary gear set assembly 414 is a Ravigneaux gear set 414 that has a first sun gear member 414A, a ring gear member 414C, a second sun gear member 414D, and a planet gear carrier 414B. The planet gear carrier 414C rotatably supports a first and a second set of pinion gears 414E, 414F (only one of each set is shown). The sun gear member 414A is connected for common rotation with a first shaft or interconnecting member 434. The ring gear member 414C is connected for common rotation with a second shaft or interconnecting member 436. The second sun gear member 414D is connected for common rotation with a third shaft or interconnecting member 438. The planet gear carrier 414B is connected for common rotation with the input shaft or member 412. The first set of pinion gears 414E is a set of short pinions that are each configured to intermesh with the first sun gear member 414A, the ring gear member 414C, and the second set of pinion gears 414F. The second set of pinion gears 414F is a set of long pinion gears that are each configured to intermesh with both the second sun gear member 414D and the first set of pinion gears 414E.

A second planetary gear set assembly 416 is a first planetary gear set 416 having a sun gear member 416C, a ring gear member 416A, and a planet gear carrier member 416B that rotatably supports a set of planetary gears 416D (only one of each is shown). The sun gear member 416C is connected for common rotation with the third shaft or interconnecting member 438. The ring gear member 416A is connected for common rotation with a fourth shaft or interconnecting member 440. The planet carrier member 416B is connected for common rotation with a fifth shaft or interconnecting member 442. The planet gears 416D are each configured to intermesh with both the sun gear member 416C and the ring gear member 416A.

A third planetary gear set assembly 418 is a second planetary gear set 418 having a sun gear member 418A, a ring gear member 418B, and a planet gear carrier member 418C that rotatably supports a first set of planet gears 418D (only one of which is shown) and a second set of planet gears 418E (only one of which is shown). The sun gear member 418A is connected for common rotation with the fifth shaft or interconnecting member 442. The ring gear member 418B is connected for common rotation with the output shaft or member 420. The planet carrier member 418C is connected for common rotation with a sixth shaft or interconnecting member 444. The planet gears 418D are each configured to intermesh with both the sun gear member 418A and the second set of planet gears 418E. The planet gears 418E are each configured to intermesh with both the ring gear member 418B and the first set of planet gears 418D.

The input shaft or member 412 is continuously connected to an input source, such as an engine (not shown) or a turbine of a torque converter (not shown). The output shaft or member 420 is continuously connected with another output such as the final drive unit or transfer case (not shown).

The torque-transmitting mechanisms, including a first and second brakes 422, 424 and a first, second, third, and fourth clutches 426, 428, 430, 442 allow for selective interconnection of the shafts or interconnecting members 434, 436, 438, 440, 442, 444 to other shafts or interconnecting members 434, 436, 438, 440, 442, 444, the members of the planetary gear sets 414, 416, 418, or the stationary member or transmission housing 450.

For example, the first brake 422 is selectively engageable to connect the sixth shaft or interconnecting member 444 to the transmission housing 450 in order to restrict the planet gear carrier 418C from rotating relative to the transmission housing 450. The second brake 424 is selectively engageable to connect the fourth shaft or interconnecting member 440 to the transmission housing 450 in order to restrict the ring gear member 416A from rotating relative to the transmission housing 450. The first clutch 426 is selectively engageable to connect the first shaft or interconnecting member 434 with the fifth shaft or interconnecting member 442. The second clutch 428 is selectively engageable to connect the first shaft or interconnecting member 434 with the fourth shaft or interconnecting member 440. The third clutch 430 is selectively engageable to connect the third shaft or interconnecting member 438 with the sixth shaft or interconnecting member 444. The fourth clutch 432 is selectively engageable to connect the second shaft or interconnecting member 436 with the output shaft or member 420. In turn, the components of the planetary gear sets connected to each of the connecting members are also connected or restricted accordingly.

Figure 9:
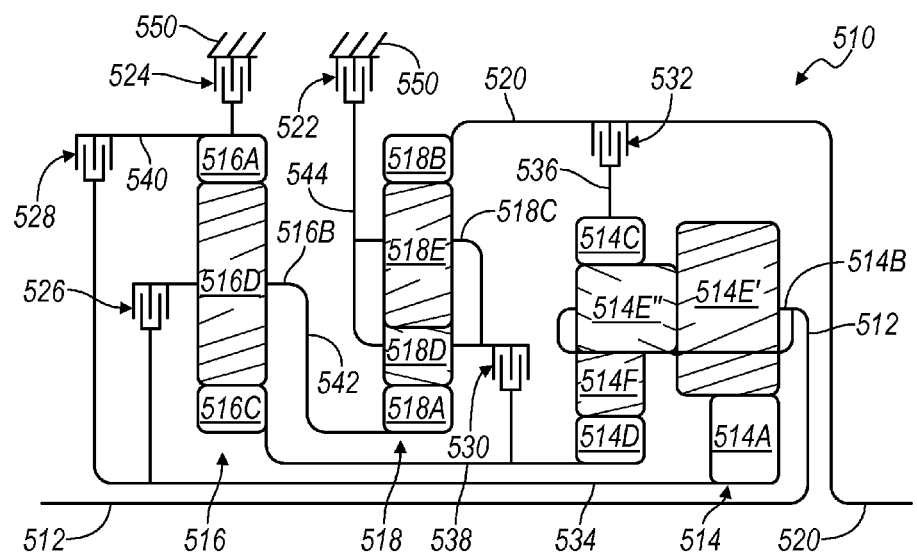
FIG. 9 is a diagrammatic illustration of a variation of the transmission of FIG. 1 according to the principles of the present invention.

Referring now to FIG. 9, a stick diagram presents a schematic layout of another embodiment of the multi-speed transmission 510 according to one form of the present invention. The clutches and couplings are correspondingly presented whereas the nodes of the planetary gear sets of FIG. 1 now appear as components of planetary gear sets or planetary gear set assemblies such as sun gears, ring gears, planet gears, combination or common gears, and planet gear carriers.

For example, a first planetary gear set assembly 514 is a Ravigneaux gear set 514 that has a first sun gear member 514A, a ring gear member 514C, a second sun gear member 514D, and a planet gear carrier 514B. The planet gear carrier 514B rotatably supports a first and a second set of pinion gears 514E, 514F (only one of each set is shown). The sun gear member 514A is connected for common rotation with a first shaft or interconnecting member 534. The ring gear member 514C is connected for common rotation with a second shaft or interconnecting member 536. The second sun gear member 514D is connected for common rotation with a third shaft or interconnecting member 538. The planet gear carrier 514B is connected for common rotation with the input shaft or member 512. The first set of pinion gears 514E is a set of stepped long pinions each having a first diameter 514E' configured to intermesh with the first sun gear member 514A and a second diameter 514E" configured to intermesh with the ring gear 514C and the second set of pinion gears 514F. The second set of pinion gears 514F is a set of short pinion gears that are each configured to intermesh with both the second sun gear member 514D and the second diameter 514E" of the first set of pinion gears 514E.

A second planetary gear set assembly 516 includes a first planetary gear set 516 having a sun gear member 516C, a ring gear member 516A, and a planet gear carrier member 516B that rotatably supports a set of planetary gears 516D (only one of each is shown). The sun gear member 516C is connected for common rotation with the third shaft or interconnecting member 538. The ring gear member 516A is connected for common rotation with a fourth shaft or interconnecting member 540. The planet carrier member 516B is connected for common rotation with a fifth shaft or interconnecting member 542. The planet gears 516D are each configured to intermesh with both the sun gear member 516C and the ring gear member 516A.

A third planetary gear set assembly 518 includes a second planetary gear set 518 having a sun gear member 518A, a ring gear member 518B, and a planet gear carrier member 518C that rotatably supports a first set of planet gears 518D (only one of which is shown) and a second set of planet gears 518E (only one of which is shown). The sun gear member 518A is connected for common rotation with the fifth shaft or interconnecting member 542. The ring gear member 518B is connected for common rotation with the output shaft or member 520. The planet carrier member 518C is connected for common rotation with a sixth shaft or interconnecting member 544. The planet gears 518D are each configured to intermesh with both the sun gear member 518A and the second set of planet gears 518E. The planet gears 518E are each configured to intermesh with both the ring gear member 518B and the first set of planet gears 518D.

The input shaft or member 512 is continuously connected to an input source, such as an engine (not shown) or a turbine of a torque converter (not shown). The output shaft or member 520 is continuously connected with another output such as the final drive unit or transfer case (not shown).

The torque-transmitting mechanisms, including a first and second brakes 522, 524 and a first, second, third, and fourth clutches 526, 528, 530, 542 allow for selective interconnection of the shafts or interconnecting members 534, 536, 538, 540, 542, 544 to other shafts or interconnecting members 534, 536, 538, 540, 542, 544, the members of the planetary gear sets 514, 516, 518, or the stationary member or transmission housing 550.

For example, the first brake 522 is selectively engageable to connect the sixth shaft or interconnecting member 544 to the transmission housing 550 in order to restrict the planet gear carrier 518C from rotating relative to the transmission housing 550. The second brake 524 is selectively engageable to connect the fourth shaft or interconnecting member 540 to the transmission housing 550 in order to restrict the ring gear member 516A from rotating relative to the transmission housing 550. The first clutch 526 is selectively engageable to connect the first shaft or interconnecting member 534 with the fifth shaft or interconnecting member 542. The second clutch 528 is selectively engageable to connect the first shaft or interconnecting member 534 with the fourth shaft or interconnecting member 540. The third clutch 530 is selectively engageable to connect the third shaft or interconnecting member 538 with the sixth shaft or interconnecting member 544. The fourth clutch 532 is selectively engageable to connect the second shaft or interconnecting member 536 with the output shaft or member 520. In turn, the components of the planetary gear sets connected to each of the connecting members are also connected or restricted accordingly.

Referring now to FIGS. 1, 7, 8, 9, and 10, the operation of the multi-speed transmissions 310, 410, 510 will be described. It will be appreciated that transmissions 310, 410, 510 are capable of transmitting torque from the input shaft or member 312, 412, 512 to the output shaft or member 320, 420, 520 in multiple forward speed torque ratios and at least one reverse speed or torque ratio. Each forward and reverse speed or torque ratio is attained by engagement of one or more of the torque-transmitting mechanisms (i.e. first brake 322, 422, 522, second brake 324, 424, 524, first clutch 326, 426, 526, second clutch 328, 428, 528, third clutch 330, 430, 530, and fourth clutch 332, 432, 532), as will be explained below.

Figures 10, 11:
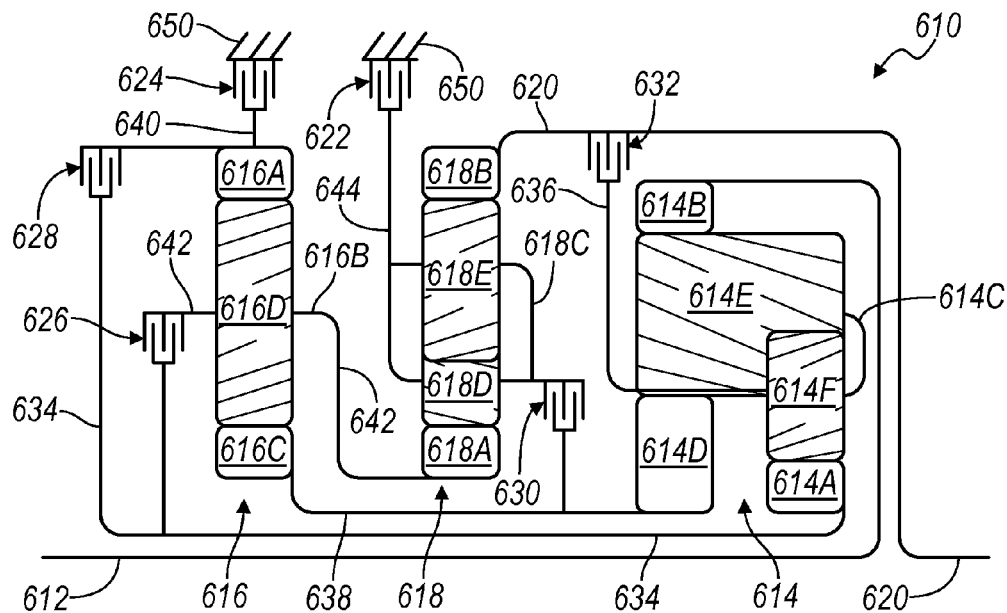
FIG. 10 is a truth table presenting an example of a state of engagement of various torque transmitting elements to produce multiple forward and at least one reverse speed or gear ratios of the transmissions illustrated in FIGS. 1 and 7-9.
FIG. 11 is a diagrammatic illustration of a variation of the transmission of FIG. 1 according to the principles of the present invention.

FIG. 10 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 310, 410, 510. Of course, other gear ratios are achievable depending on the gear diameter, gear teeth count and gear configuration selected.

For example, a reverse gear is established by engaging or activating the first brake 322, 422, 522, second brake 324, 424, 524, and the fourth clutch 332, 432, 532. The first brake 322, 422, 522 connects the sixth shaft or interconnecting member 344, 444, 544, and therefore the planet gear carrier 318C, 418C, 518C of the third planetary gear set assembly 318, 418, 518, to the transmission housing 350, 450, 550 in order to restrict planet gear carrier 318C, 418C, 518C of the third planetary gear set assembly 318, 418, 518 from rotating relative to the transmission housing 350, 450, 550. The second brake 324 connects the fourth shaft or interconnecting member 340, 440, 540, and therefore the ring gear 316A, 416A, 516A of the second planetary gear set assembly 316, 416, 516, to the transmission housing 350, 450, 550 in order to restrict the ring gear 316A, 416A, 516A of the second planetary gear set assembly 316, 416, 516 from rotating relative to the transmission housing 350, 450, 550. The fourth clutch 332, 432, 532 connects the second shaft or interconnecting member 336, 436, 536, and therefore the ring gear member coupled to a planet gear carrier 314C, 414C, 514C of the first planetary gear set assembly 314, 414, 514 with output shaft or member 320. Likewise, the fourteen forward ratios are achieved through different combinations of clutch and brake engagement, as shown in FIG. 10, by way of example Referring now to FIG. 11, a stick diagram presents a schematic layout of another embodiment of the multi-speed transmission 610 according to one form of the present invention. The clutches and couplings are correspondingly presented whereas the nodes of the planetary gear sets of FIG. 1 now appear as components of planetary gear sets or planetary gear set assemblies such as sun gears, ring gears, planet gears, combination or common gears, and planet gear carriers.

For example, a first planetary gear set assembly 614 is a Ravigneaux gear set 614 that has a first sun gear member 614A, a ring gear member 614B, a second sun gear member 614D, and a planet gear carrier 614C. The planet gear carrier 614C rotatably supports a first and a second set of pinion gears 614E, 614F (only one of each set is shown). The sun gear member 614A is connected for common rotation with a first shaft or interconnecting member 634. The planet gear carrier 614C is connected for common rotation with a second shaft or interconnecting member 636. The ring gear member 614B is connected for common rotation with the input shaft or member 612. The second sun gear member 614D is connected for common rotation with a third shaft or interconnecting member 638. The first set of pinion gears 614E is a set of long pinions configured to intermesh with the second sun gear member 614D, the ring gear member 614B, and the second set of pinion gears 614F. The second set of pinion gears 614F is a set of short pinion gears that are each configured to intermesh with both the first sun gear member 614A and the first set of pinion gears 614E.

A second planetary gear set assembly 616 is a first planetary gear set 616 having a sun gear member 616C, a ring gear member 616A, and a planet gear carrier member 616B that rotatably supports a set of planetary gears 616D (only one of each is shown). The sun gear member 616C is connected for common rotation with the third shaft or interconnecting member 638. The ring gear member 616A is connected for common rotation with a fourth shaft or interconnecting member 640. The planet carrier member 616B is connected for common rotation with a fifth shaft or interconnecting member 642. The planet gears 616D are each configured to intermesh with both the sun gear member 616C and the ring gear member 616A.

A third planetary gear set assembly 618 is a second planetary gear set 618 having a sun gear member 618A, a ring gear member 618B, and a planet gear carrier member 618C that rotatably supports a first set of planet gears 618D (only one of which is shown) and a second set of planet gears 618E (only one of which is shown). The sun gear member 618A is connected for common rotation with the fifth shaft or interconnecting member 642. The ring gear member 618B is connected for common rotation with the output shaft or member 620. The planet carrier member 618B is connected for common rotation with a sixth shaft or interconnecting member 644. The planet gears 618D are each configured to intermesh with both the sun gear member 618A and the second set of planet gears 618E. The planet gears 618E are each configured to intermesh with both the ring gear member 618B and the first set of planet gears 618D.

The input shaft or member 612 is continuously connected to an input source, such as an engine (not shown) or a turbine of a torque converter (not shown). The output shaft or member 620 is continuously connected with another output such as the final drive unit or transfer case (not shown).

The torque-transmitting mechanisms, including a first and second brakes 622, 624 and a first, second, third, and fourth clutches 626, 628, 630, 642 allow for selective interconnection of the shafts or interconnecting members 634, 636, 638, 640, 642, 644 to other shafts or interconnecting members 634, 636, 638, 640, 642, 644, the members of the planetary gear sets 614, 616, 618, or the stationary member or transmission housing 650.

For example, the first brake 622 is selectively engageable to connect the sixth shaft or interconnecting member 644 to the transmission housing 650 in order to restrict the planet gear carrier 618C from rotating relative to the transmission housing 650. The second brake 624 is selectively engageable to connect the fourth shaft or interconnecting member 640 to the transmission housing 650 in order to restrict the ring gear member 616A from rotating relative to the transmission housing 650. The first clutch 626 is selectively engageable to connect the first shaft or interconnecting member 634 with the fifth shaft or interconnecting member 642. The second clutch 628 is selectively engageable to connect the first shaft or interconnecting member 634 with the fourth shaft or interconnecting member 640. The third clutch 630 is selectively engageable to connect the third shaft or interconnecting member 638 with the sixth shaft or interconnecting member 644. The fourth clutch 632 is selectively engageable to connect the second shaft or interconnecting member 636 with the output shaft or member 620. In turn, the components of the planetary gear sets connected to each of the connecting members are also connected or restricted accordingly.

Figure 12:
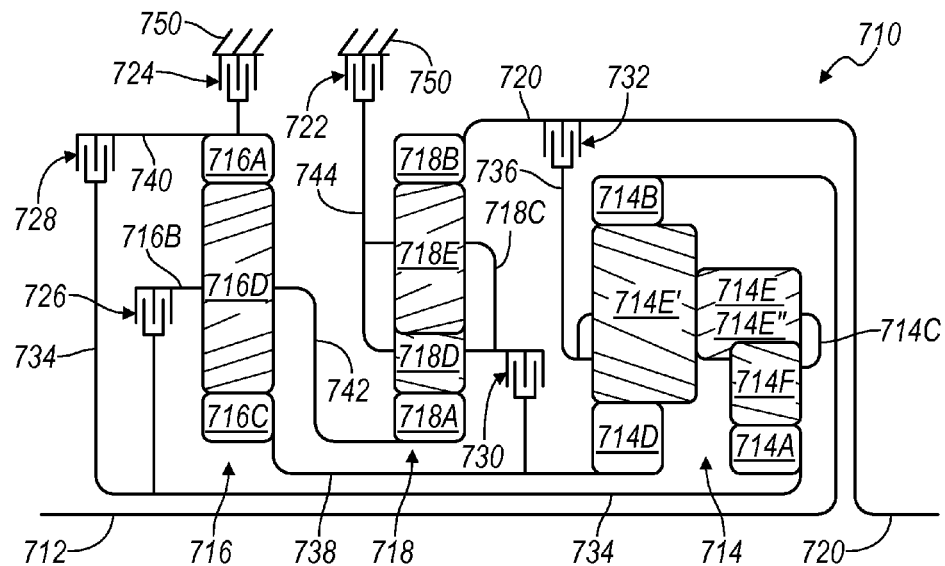
FIG. 12 is a diagrammatic illustration of a variation of the transmission of FIG. 1 according to the principles of the present invention.

Referring now to FIG. 12, a stick diagram presents a schematic layout of another embodiment of the multi-speed transmission 710 according to one form of the present invention. The clutches and couplings are correspondingly presented whereas the nodes of the planetary gear sets of FIG. 1 now appear as components of planetary gear sets or planetary gear set assemblies such as sun gears, ring gears, planet gears, combination or common gears, and planet gear carriers.

For example, a first planetary gear set assembly 714 is a Ravigneaux gear set 714 that has a first sun gear member 714A, a ring gear member 714B, a second sun gear member 714D, and a planet gear carrier 714C. The planet gear carrier 714B rotatably supports a first and a second set of pinion gears 714E, 714F (only one of each set is shown). The sun gear member 714A is connected for common rotation with a first shaft or interconnecting member 734. The planet gear carrier 714C is connected for common rotation with a second shaft or interconnecting member 736. The second sun gear member 714D is connected for common rotation with a third shaft or interconnecting member 738. The ring gear member 714B is connected for common rotation with the input shaft or member 712. The first set of pinion gears 714E is a set of stepped long pinions each having a first diameter 714E' configured to intermesh with the second sun gear member 714D and the ring gear member 714B and a second diameter 714E" configured to intermesh with the second set of pinion gears 714F. The second set of pinion gears 714F is a set of short pinion gears that are each configured to intermesh with both the first sun gear member 714A and the second diameter 714E" of the first set of pinion gears 714E.

A second planetary gear set assembly 716 is a first planetary gear set 716 having a sun gear member 716C, a ring gear member 716A, and a planet gear carrier member 716B that rotatably supports a set of planetary gears 716D (only one of each is shown). The sun gear member 716C is connected for common rotation with the third shaft or interconnecting member 738. The ring gear member 716A is connected for common rotation with a fourth shaft or interconnecting member 740. The planet carrier member 716B is connected for common rotation with a fifth shaft or interconnecting member 742. The planet gears 716D are each configured to intermesh with both the sun gear member 716C and the ring gear member 716A.

A third planetary gear set assembly 718 is a second planetary gear set 718 having a sun gear member 718A, a ring gear member 718B, and a planet gear carrier member 718C that rotatably supports a first set of planet gears 718D (only one of which is shown) and a second set of planet gears 718E (only one of which is shown). The sun gear member 718A is connected for common rotation with the fifth shaft or interconnecting member 742. The ring gear member 718B is connected for common rotation with the output shaft or member 720. The planet carrier member 718C is connected for common rotation with a sixth shaft or interconnecting member 744. The planet gears 718D are each configured to intermesh with both the sun gear member 718A and the second set of planet gears 718E. The planet gears 718E are each configured to intermesh with both the ring gear member 718B and the first set of planet gears 718D.

The input shaft or member 712 is continuously connected to an input source, such as an engine (not shown) or a turbine of a torque converter (not shown). The output shaft or member 720 is continuously connected with another output such as the final drive unit or transfer case (not shown).

The torque-transmitting mechanisms, including a first and second brakes 722, 724 and a first, second, third, and fourth clutches 726, 728, 730, 742 allow for selective interconnection of the shafts or interconnecting members 734, 736, 738, 740, 742, 744 to other shafts or interconnecting members 734, 736, 738, 740, 742, 744, the members of the planetary gear sets 714, 716, 718, or the stationary member or transmission housing 750.

For example, the first brake 722 is selectively engageable to connect the sixth shaft or interconnecting member 744 to the transmission housing 750 in order to restrict the planet gear carrier 718C from rotating relative to the transmission housing 750. The second brake 724 is selectively engageable to connect the fourth shaft or interconnecting member 740 to the transmission housing 750 in order to restrict the ring gear member 716A from rotating relative to the transmission housing 750. The first clutch 726 is selectively engageable to connect the first shaft or interconnecting member 734 with the fifth shaft or interconnecting member 742. The second clutch 728 is selectively engageable to connect the first shaft or interconnecting member 734 with the fourth shaft or interconnecting member 740. The third clutch 730 is selectively engageable to connect the third shaft or interconnecting member 738 with the sixth shaft or interconnecting member 744. The fourth clutch 732 is selectively engageable to connect the second shaft or interconnecting member 736 with the output shaft or member 720. In turn, the components of the planetary gear sets connected to each of the connecting members are also connected or restricted accordingly.

Figure 13:
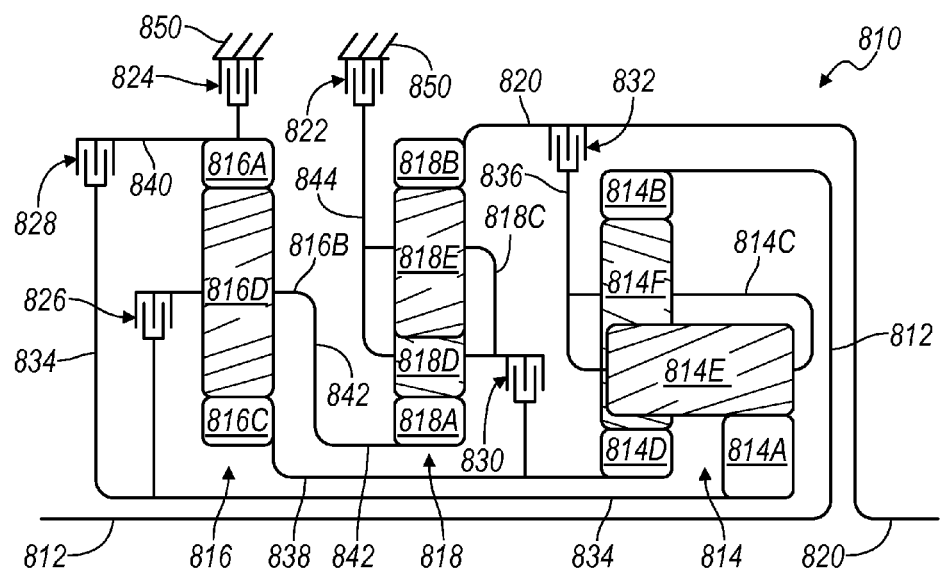
FIG. 13 is a diagrammatic illustration of a variation of the transmission of FIG. 1 according to the principles of the present invention.

Referring now to FIG. 13, a stick diagram presents a schematic layout of another embodiment of the multi-speed transmission 810 according to one form of the present invention. The clutches and couplings are correspondingly presented whereas the nodes of the planetary gear sets of FIG. 1 now appear as components of planetary gear sets or planetary gear set assemblies such as sun gears, ring gears, planet gears, combination or common gears, and planet gear carriers.

For example, a first planetary gear set assembly 814 is a Ravigneaux gear set 814 that has a first sun gear member 814A, a ring gear member 814B, a second sun gear member 814D, and a planet gear carrier 814C. The planet gear carrier 814C rotatably supports a first and a second set of pinion gears 814E, 814F (only one of each set is shown). The sun gear member 814A is connected for common rotation with a first shaft or interconnecting member 834. The planet gear carrier 814C is connected for common rotation with a second shaft or interconnecting member 836. The ring gear member 814B is connected for common rotation with the input shaft or member 812. The second sun gear member 814D is connected for common rotation with a third shaft or interconnecting member 838. The first set of pinion gears 814E is a set of long pinions configured to intermesh with the first sun gear member 814A and the second set of pinion gears 814F. The second set of pinion gears 814F is a set of short pinion gears that are each configured to intermesh with each of the second sun gear member 814D, the ring gear member 814B, and the first set of pinion gears 814E.

A second planetary gear set assembly 816 is a first planetary gear set 816 having a sun gear member 816C, a ring gear member 816A, and a planet gear carrier member 816B that rotatably supports a set of planetary gears 816D (only one of each is shown). The sun gear member 816C is connected for common rotation with the third shaft or interconnecting member 838. The ring gear member 816A is connected for common rotation with a fourth shaft or interconnecting member 840. The planet carrier member 816B is connected for common rotation with a fifth shaft or interconnecting member 842. The planet gears 816D are each configured to intermesh with both the sun gear member 816C and the ring gear member 816A.

A third planetary gear set assembly 818 is a second planetary gear set 818 having a sun gear member 818A, a ring gear member 818B, and a planet gear carrier member 818C that rotatably supports a first set of planet gears 818D (only one of which is shown) and a second set of planet gears 818E (only one of which is shown). The sun gear member 818A is connected for common rotation with the fifth shaft or interconnecting member 842. The ring gear member 818B is connected for common rotation with the output shaft or member 820. The planet carrier member 818C is connected for common rotation with a sixth shaft or interconnecting member 844. The planet gears 818D are each configured to intermesh with both the sun gear member 818A and the second set of planet gears 818E. The planet gears 818E are each configured to intermesh with both the ring gear member 818B and the first set of planet gears 818D.

The input shaft or member 812 is continuously connected to an input source, such as an engine (not shown) or a turbine of a torque converter (not shown). The output shaft or member 820 is continuously connected with another output such as the final drive unit or transfer case (not shown).

The torque-transmitting mechanisms, including a first and second brakes 822, 824 and a first, second, third, and fourth clutches 826, 828, 830, 842 allow for selective interconnection of the shafts or interconnecting members 834, 836, 838, 840, 842, 844 to other shafts or interconnecting members 834, 836, 838, 840, 842, 844, the members of the planetary gear sets 814, 816, 818, or the stationary member or transmission housing 850.

For example, the first brake 822 is selectively engageable to connect the sixth shaft or interconnecting member 844 to the transmission housing 850 in order to restrict the planet gear carrier 818C from rotating relative to the transmission housing 850. The second brake 824 is selectively engageable to connect the fourth shaft or interconnecting member 840 to the transmission housing 850 in order to restrict the ring gear member 816A from rotating relative to the transmission housing 850. The first clutch 826 is selectively engageable to connect the first shaft or interconnecting member 834 with the fifth shaft or interconnecting member 842. The second clutch 828 is selectively engageable to connect the first shaft or interconnecting member 834 with the fourth shaft or interconnecting member 840. The third clutch 830 is selectively engageable to connect the third shaft or interconnecting member 838 with the sixth shaft or interconnecting member 844. The fourth clutch 832 is selectively engageable to connect the second shaft or interconnecting member 836 with the output shaft or member 820. In turn, the components of the planetary gear sets connected to each of the connecting members are also connected or restricted accordingly.

Referring now to FIGS. 1, 11, 12, 13, and 14, the operation of the multi-speed transmissions 610, 710, 810 will be described. It will be appreciated that transmissions 610, 710, 810 are capable of transmitting torque from the input shaft or member 612, 712, 812 to the output shaft or member 620, 720, 820 in multiple forward speed torque ratios and at least one reverse speed or torque ratio. Each forward and reverse speed or torque ratio is attained by engagement of one or more of the torque-transmitting mechanisms (i.e. first brake 622, 722, 822, second brake 624, 724, 824, first clutch 626, 726, 826, second clutch 628, 728, 828, third clutch 630, 730, 830, and fourth clutch 632, 732, 832), as will be explained below.

FIG. 14 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmissions 610, 710, 810. Of course, other gear ratios are achievable depending on the gear diameter, gear teeth count and gear configuration selected.

For example, a reverse gear is established by engaging or activating the first brake 622, 722, 822, second brake 624, 724, 824, and the fourth clutch 632, 732, 832. The first brake 622, 722, 822 connects the sixth shaft or interconnecting member 644, 744, 844, and therefore the planet gear carrier 618C, 718C, 818C of the third planetary gear set assembly 618, 718, 818, to the transmission housing 650, 750, 850 in order to restrict planet gear carrier 618C, 718C, 818C of the third planetary gear set assembly 618, 718, 818 from rotating relative to the transmission housing 650, 750, 850. The second brake 624, 724, 824 connects the fourth shaft or interconnecting member 640, 740, 840, and therefore the ring gear 616A, 716A, 816A of the second planetary gear set assembly 616, 716, 816, to the transmission housing in order to restrict the ring gear 616A, 716A, 816A of the second planetary gear set assembly 616, 716, 816 from rotating relative to the transmission housing 650, 750, 850 from rotating relative to the transmission housing 650, 750, 850. The fourth clutch 632, 732, 832 connects the second shaft or interconnecting member 636, 736, 836, and therefore the ring gear member coupled to a planet gear carrier 614C, 714C, 814C of the first planetary gear set assembly 614, 714, 814 with output shaft or member 620, 720, 820. Likewise, the fourteen forward ratios are achieved through different combinations of clutch and brake engagement, as shown in FIG. 15, by way of example The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, and third planetary gear sets each having at least a first, second, and third members, and wherein the first planetary gear set further includes a fourth member;
two interconnecting members continuously interconnecting a member of the first, second, and third planetary gear sets with another member of the first, second, and third planetary gear sets; and
six torque transmitting mechanisms each selectively engageable to interconnect a member of the first, second, and third planetary gear sets with another member of the first, second, and third planetary gear sets or a stationary member, and
wherein the six torque transmitting mechanisms are selectively engageable in combinations of at least three to establish a plurality of forward speed ratios and at least one reverse speed ratio between the input member and the output member, a first of the six torque transmitting mechanisms is selectively engageable to interconnect the first member of the first planetary gear set with the first member of the second planetary gear set, and a second of the six torque transmitting mechanisms is selectively engageable to interconnect the first member of the first planetary gear set with the second member of the second planetary gear set.

2. The transmission of claim 1 wherein a first of the two interconnecting members continuously interconnects the fourth member of the first planetary gear set with the third member of the second planetary gear set.

3. The transmission of claim 2 wherein a second of the two interconnecting members continuously interconnects the second member of the second planetary gear set with the first member of the third planetary gear set.

4. The transmission of claim 1 wherein a third of the six torque transmitting mechanisms is selectively engageable to interconnect the third member of the first planetary gear set with the second member of the third planetary gear set.

5. The transmission of claim 4 wherein a fourth of the six torque transmitting mechanisms is selectively engageable to interconnect the third member of the second planetary gear set with the third member of the third planetary gear set.

6. The transmission of claim 5 wherein a fifth of the six torque transmitting mechanisms is selectively engageable to interconnect the first member of the second planetary gear set with the stationary member.

7. The transmission of claim 6 wherein a sixth of the six torque transmitting mechanisms is selectively engageable to interconnect the third member of the third planetary gear set with the stationary member.

8. The transmission of claim 1 wherein the input member is continuously connected for common rotation with the second member of the first planetary gear set.

9. The transmission of claim 8 wherein the output member is continuously connected for common rotation with the second member of the third planetary gear set.

10. The transmission of claim 1 wherein the first member of the first planetary gear set, the third member of the second planetary gear set, and the first member of the third planetary gear set are first sun gears, the first member of the second planetary gear set and the second member of the third planetary gear set are ring gears, and the second member of the second planetary gear set and the third member of the third planetary gear set are planet carriers.

11. The transmission of claim 10 wherein the second member of the first planetary gear set is a ring gear, the third member of the first planetary gear set is a planet carrier, and the fourth member of the first planetary gear set is a combined sun/ring gear.

12. The transmission of claim 10 wherein the second and third members of the first planetary gear set include a ring gear combined with a planet carrier and the fourth member of the first planetary gear set is a sun gear.

13. The transmission of clam 10 wherein the second member of the first planetary gear set is a planet carrier, the third member of the first planetary gear set is a ring gear, the fourth member of the first planetary gear set is a second sun gear, and the first planetary gear set includes a first and a second set of pinions rotatably supported by the planet carrier, the first set of pinions are long pinions and mesh with the first sun gear, the ring gear, and the second set of pinions, and the second set of pinions are short pinions and mesh with the first set of pinions and the second sun gear.

14. The transmission of clam 10 wherein the second member of the first planetary gear set is a planet carrier, the third member of the first planetary gear set is a ring gear, the fourth member of the first planetary gear set is a second sun gear, and the first planetary gear set includes a first and a second set of pinions rotatably supported by the planet carrier, the first set of pinions are short pinions and mesh with the first sun gear, the ring gear, and the second set of pinions, and the second set of pinions are long pinions and mesh with the first set of pinions and the second sun gear.

15. The transmission of claim 10 wherein the second member of the first planetary gear set is a planet carrier, the third member of the first planetary gear set is a ring gear, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion mesh with the first sun gear, the small diameter portion mesh with the ring gear and the second set of pinions, and the second set of pinions are short pinions and mesh with the small diameter portion of the first set of pinions and the second sun gear.

16. The transmission of claim 10 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions, the first set of pinions mesh with the first sun gear and the second set of pinions, the second set of pinions are long pinions and mesh with the ring gear and the second sun gear.

17. The transmission of claim 10 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion mesh with the second sun gear and the ring gear, the small diameter portion mesh with the second set of pinions, and the second set of pinions are short pinions and mesh with the small diameter portion of the first set of pinions and the first sun gear.

18. The transmission of claim 10 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are long pinions meshing with the first sun gear and the second set of pinions, and the second set of pinions are short pinions and mesh with the the first set of pinions, the ring gear, and the second sun gear.

19. A transmission comprising:
an input member;
an output member;
first, second, and third planetary gear sets each having at least a first, second, and third members, and wherein the first planetary gear set further includes a fourth member, and wherein the input member is continuously connected for common rotation with the second member of the first planetary gear set and the output member is continuously connected for common rotation with the second member of the third planetary gear set;
a first interconnecting member continuously interconnecting the fourth member of the first planetary gear set with the third member of the second planetary gear set;
a second interconnecting member continuously interconnecting the second member of the second planetary gear set with the first member of the third planetary gear set; and
six torque transmitting mechanisms each selectively engageable to interconnect a member of the first, second, and third planetary gear sets with another member of the first, second, and third planetary gear sets or a stationary member, and
wherein the six torque transmitting mechanisms are selectively engageable in combinations of at least three to establish a plurality of forward speed ratios and at least one reverse speed ratio between the input member and the output member, a first of the six torque transmitting mechanisms is selectively enqaqeable to interconnect the first member of the first planetary gear set with the first member of the second planetary gear set, and a second of the six torque transmitting mechanisms is selectively enqaqeable to interconnect the first member of the first planetary gear set with the second member of the second planetary gear set.

20. The transmission of claim 19 wherein a third of the six torque transmitting mechanisms is selectively engageable to interconnect the third member of the first planetary gear set with the second member of the third planetary gear set.

21. The transmission of claim 20 wherein a fourth of the six torque transmitting mechanisms is selectively engageable to interconnect the third member of the second planetary gear set with the third member of the third planetary gear set.

22. The transmission of claim 21 wherein a fifth of the six torque transmitting mechanisms is selectively engageable to interconnect the first member of the second planetary gear set with the stationary member.

23. The transmission of claim 22 wherein a sixth of the six torque transmitting mechanisms is selectively engageable to interconnect the third member of the third planetary gear set with the stationary member.

24. The transmission of claim 19 wherein the first member of the first planetary gear set, the third member of the second planetary gear set, and the first member of the third planetary gear set are first sun gears, the first member of the second planetary gear set and the second member of the third planetary gear set are ring gears, and the second member of the second planetary gear set and the third member of the third planetary gear set are planet carriers.

25. The transmission of claim 24 wherein the second member of the first planetary gear set is a ring gear, the third member of the first planetary gear set is a planet carrier, and the fourth member of the first planetary gear set is a combined sun/ring gear.

26. The transmission of claim 24 wherein the second and third members of the first planetary gear set include a ring gear combined with a planet carrier and the fourth member of the first planetary gear set is a sun gear.

27. The transmission of clam 24 wherein the second member of the first planetary gear set is a planet carrier, the third member of the first planetary gear set is a ring gear, the fourth member of the first planetary gear set is a second sun gear, and the first planetary gear set includes a first and a second set of pinions rotatably supported by the planet carrier, the first set of pinions are long pinions and mesh with the first sun gear, the ring gear, and the second set of pinions, and the second set of pinions are short pinions and mesh with the first set of pinions and the second sun gear.

28. The transmission of clam 24 wherein the second member of the first planetary gear set is a planet carrier, the third member of the first planetary gear set is a ring gear, the fourth member of the first planetary gear set is a second sun gear, and the first planetary gear set includes a first and a second set of pinions rotatably supported by the planet carrier, the first set of pinions are short pinions and mesh with the first sun gear, the ring gear, and the second set of pinions, and the second set of pinions are long pinions and mesh with the first set of pinions and the second sun gear.

29. The transmission of claim 24 wherein the second member of the first planetary gear set is a planet carrier, the third member of the first planetary gear set is a ring gear, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion mesh with the first sun gear, the small diameter portion mesh with the ring gear and the second set of pinions, and the second set of pinions are short pinions and mesh with the small diameter portion of the first set of pinions and the second sun gear.

30. The transmission of claim 24 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions, the first set of pinions mesh with the first sun gear and the second set of pinions, the second set of pinions are long pinions and mesh with the ring gear and the second sun gear.

31. The transmission of claim 24 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion mesh with the second sun gear and the ring gear, the small diameter portion mesh with the second set of pinions, and the second set of pinions are short pinions and mesh with the small diameter portion of the first set of pinions and the first sun gear.

32. The transmission of claim 24 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are long pinions meshing with the first sun gear and the second set of pinions, and the second set of pinions are short pinions and mesh with the the first set of pinions, the ring gear, and the second sun gear.

33. A transmission comprising:
an input member;
an output member;
first, second, and third planetary gear sets each having at least a first, second, and third members, and wherein the first planetary gear set further includes a fourth member, and wherein the input member is continuously connected for common rotation with the second member of the first planetary gear set and the output member is continuously connected for common rotation with the second member of the third planetary gear set;
two interconnecting members continuously interconnecting a member of the first, second, and third planetary gear sets with another member of the first, second, and third planetary gear sets; and
a first torque transmitting mechanism selectively engageable to interconnect the first member of the first planetary gear set with the first member of the second planetary gear set;
a second torque transmitting mechanism selectively engageable to interconnect the first member of the first planetary gear set with the second member of the second planetary gear set;
a third torque transmitting mechanism selectively engageable to interconnect the third member of the first planetary gear set with the second member of the third planetary gear set;
a fourth torque transmitting mechanism selectively engageable to interconnect the third member of the second planetary gear set with the third member of the third planetary gear set;
a fifth torque transmitting mechanism selectively engageable to interconnect the first member of the second planetary gear set with the stationary member;
a sixth torque transmitting mechanism selectively engageable to interconnect the third member of the third planetary gear set with the stationary member, and
wherein the six torque transmitting mechanisms are selectively engageable in combinations of at least three to establish a plurality of forward speed ratios and at least one reverse speed ratio between the input member and the output member.

34. The transmission of claim 33 wherein a first of the two interconnecting members continuously interconnects the fourth member of the first planetary gear set with the third member of the second planetary gear set.

35. The transmission of claim 34 wherein a second of the two interconnecting members continuously interconnects the second member of the second planetary gear set with the first member of the third planetary gear set.

36. The transmission of claim 33 wherein the first member of the first planetary gear set, the third member of the second planetary gear set, and the first member of the third planetary gear set are first sun gears, the first member of the second planetary gear set and the second member of the third planetary gear set are ring gears, and the second member of the second planetary gear set and the third member of the third planetary gear set are planet carriers.

37. The transmission of claim 36 wherein the second member of the first planetary gear set is a ring gear, the third member of the first planetary gear set is a planet carrier, and the fourth member of the first planetary gear set is a combined sun/ring gear.

38. The transmission of claim 36 wherein the second and third members of the first planetary gear set include a ring gear combined with a planet carrier and the fourth member of the first planetary gear set is a sun gear.

39. The transmission of clam 36 wherein the second member of the first planetary gear set is a planet carrier, the third member of the first planetary gear set is a ring gear, the fourth member of the first planetary gear set is a second sun gear, and the first planetary gear set includes a first and a second set of pinions rotatably supported by the planet carrier, the first set of pinions are long pinions and mesh with the first sun gear, the ring gear, and the second set of pinions, and the second set of pinions are short pinions and mesh with the first set of pinions and the second sun gear.

40. The transmission of clam 36 wherein the second member of the first planetary gear set is a planet carrier, the third member of the first planetary gear set is a ring gear, the fourth member of the first planetary gear set is a second sun gear, and the first planetary gear set includes a first and a second set of pinions rotatably supported by the planet carrier, the first set of pinions are short pinions and mesh with the first sun gear, the ring gear, and the second set of pinions, and the second set of pinions are long pinions and mesh with the first set of pinions and the second sun gear.

41. The transmission of claim 36 wherein the second member of the first planetary gear set is a planet carrier, the third member of the first planetary gear set is a ring gear, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion mesh with the first sun gear, the small diameter portion mesh with the ring gear and the second set of pinions, and the second set of pinions are short pinions and mesh with the small diameter portion of the first set of pinions and the second sun gear.

42. The transmission of claim 36 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are short pinions, the first set of pinions mesh with the first sun gear and the second set of pinions, the second set of pinions are long pinions and mesh with the ring gear and the second sun gear.

43. The transmission of claim 36 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are long pinions having a large diameter portion and a small diameter portion, the large diameter portion mesh with the second sun gear and the ring gear, the small diameter portion mesh with the second set of pinions, and the second set of pinions are short pinions and mesh with the small diameter portion of the first set of pinions and the first sun gear.

44. The transmission of claim 36 wherein the second member of the first planetary gear set is a ring gear, the third member of the first planetary gear set is a planet carrier, the fourth member of the first planetary gear set is a second sun gear, and the first planetary gear set includes a first and a second set of pinions rotatably supported by the planet carrier, the first set of pinions are long pinions meshing with the first sun gear and the second set of pinions, and the second set of pinions are short pinions and mesh with the the first set of pinions, the ring gear, and the second sun gear.

* * * * *